United States Patent [19]
Evanyk

[11] Patent Number: 5,822,678
[45] Date of Patent: Oct. 13, 1998

[54] CATV NETWORK FOR TRANSPORT OF RADIO FREQUENCY SIGNALS

[75] Inventor: Walter R. Evanyk, Plano, Tex.

[73] Assignee: Ericsson, Inc., Richardson, Tex.

[21] Appl. No.: 705,209

[22] Filed: Aug. 29, 1996

[51] Int. Cl.[6] .................................................. H04N 7/173
[52] U.S. Cl. .............................................. 455/5.1; 348/12
[58] Field of Search ........................... 455/3.1, 6.1, 5.1, 455/4.2, 6.2, 6.3; 348/6, 7, 12, 13, 17, 19; H04N 7/16, 7/173

[56] References Cited

U.S. PATENT DOCUMENTS

| | | | |
|---|---|---|---|
| 5,124,980 | 6/1992 | Maki | 370/77 |
| 5,214,390 | 5/1993 | Montreuil | 329/309 |
| 5,271,041 | 12/1993 | Montreuil | 375/97 |
| 5,293,633 | 3/1994 | Robbins | 455/3.1 |
| 5,343,240 | 8/1994 | Yu | 348/14 |
| 5,381,459 | 1/1995 | Lappington | 379/56 |
| 5,408,259 | 4/1995 | Warwick | 348/6 |
| 5,408,260 | 4/1995 | Arnon | 348/6 |
| 5,412,352 | 5/1995 | Graham | 332/103 |
| 5,425,027 | 6/1995 | Baran | 370/69.1 |
| 5,446,918 | 8/1995 | Lamy | 455/5.1 |
| 5,469,495 | 11/1995 | Beveridge | 379/56 |
| 5,488,412 | 1/1996 | Majeti et al. | 348/10 |
| 5,488,413 | 1/1996 | Elder et al. | 348/13 |
| 5,528,582 | 6/1996 | Bodeep et al. | 370/24 |
| 5,625,865 | 4/1997 | Moehrmann | 455/4.2 |
| 5,638,422 | 6/1997 | Roman | 379/58 |
| 5,640,196 | 6/1997 | Behrens et al. | 455/5.1 |
| 5,642,155 | 6/1997 | Cheng | 348/12 |

FOREIGN PATENT DOCUMENTS 0 421 602  4/1991  United Kingdom .

WO 95/26104  9/1995  WIPO .

OTHER PUBLICATIONS

D. Large, "Creating a Network for Interactivity," *IEEE Spectrum*, 32, No. 4, (Apr. 1995), pp. 58–63.

N.K. Shankaranarayanan, et al., "Multiport Wireless Access System Using Fiber/Coax Networks for Personal Communications Services (PCS) and Subscriber Loop Applications," 14, (Nov. 1995), pp. 977–981.

*Primary Examiner*—Chris Grant
*Attorney, Agent, or Firm*—Jenkens & Gilchrist, P.C.

[57] ABSTRACT

A communication system is coupled to a cable television network wherein cable television signals, data signals and telephonic signals are transmitted on the coaxial cable infrastructure. To facilitate the simultaneous transmission of cable signals, data signals and telephonic signals, a frequency spectrum is defined for a coaxial cable network in which a band of frequencies for carrying telephonic signals is interposed in the cable television signals bands of frequencies. In a coaxial cable system capable of carrying signals up to 1 megahertz in frequency, a total of 5 frequency bands are defined. Within the frequency band for carrying telephonic signals, signals from a PCS system or the like as well as signals from other telecommunication devices, one system, such as SMS centers, base stations and mobile switching centers may be transmitted. Additionally, television channels may also be transmitted in this frequency band if the beginning of the frequency is at a frequency channel for carrying a cable television channel. A method includes transmitting the various types of signals within the specified frequency bands.

22 Claims, 4 Drawing Sheets

CATV NETWORK FOR TRANSPORT OF RADIO FREQUENCY SIGNALS

BACKGROUND OF THE INVENTION

1. Technical Field of the Invention

This invention relates to communication systems, and more specifically, to systems, networks and infrastructures for transporting signals for wireless communications systems.

2. Description of Related Art

Current communications networks for use by the general public include the public switched telephone network ("PSTN") for wireline communications and many different cellular based networks including analog systems such as the Advanced Mobile Phone Service ("AMPS") and digital systems such as Global System for Mobile ("GSM") communications. Additionally, new digital networks such as the Personal Communication System ("PCS") are being tested and are under development in the United States of America. PCS systems are already in use in Europe.

Under wireline and wireless systems as currently implemented on a wide scale, a number is assigned either to a fixed location (in the case of wireline systems) or to a fixed cellular phone (in the case of wireless systems). Under proposed PCS systems, however, a number is assigned to the user and is not always assigned to a fixed location. Accordingly, as the user travels from one location to another, the user registers their presence so that their calls may follow them. The PCS system, then, updates the cellular equivalent of a visitor location register as well as a home location register whenever the user registers their presence at a location. Accordingly, the phone at the registered location is signaled for setting up a call whenever the user's number is dialed.

One notable characteristic of PCS networks is that proposed cell areas for PCS systems are smaller than those for current GSM systems. By way of example, a PCS cell area may be defined as a hexagon whose outer perimeters are within the range of 200 feet to 2000 feet from the base station. A typical GSM cell radius, on the other hand, is in the range of two to three miles. One advantage and reason for reducing the size of cell areas is related to the concept of frequency reuse. Generally, a frequency channel may be reused as frequently as every other cell. It is quite possible to use the same frequency channel in alternating cells. Thus, the implementation of PCS the corresponding use of smaller cells will provide a solution to the continuously increasing need to use a limited number of frequency channels. At the same time, current infrastructure for communications between mobile switching centers and base station systems may well become overloaded as PCS systems are implemented.

Current plans to develop PCS communication systems into a nationwide system will therefore create a great need for additional underlying electronic infrastructure for managing and facilitating the PCS communication system's capabilities. The tremendous cost, however, of adding the requisite amount of cabling could slow the development of these PCS communication systems.

At the same time that there is a need to develop infrastructure for PCS communication systems, there is an ever expanding set of wireline telephonic capabilities. As phone companies continue to increase the types and quantity of subscriber features, consumers are expressing demand for additional telephone lines. Some consumers are even starting to request digital phone lines such as those which form a part of the Integrated Services Digital Network ("ISDN"). There exists a general perception that phone service, including wireline services, will eventually be all digital because of the many benefits of digital including time division multiplexing and data compression. Accordingly, the infrastructure for supporting wireline services will, at a minimum, need to be expanded to support future needs as indicated by current trends.

One proposed solution for current telecommunication signal transmission is to use the existing cable television (CATV) cable plant infrastructure for carrying telephonic traffic. It is known that channels within the frequency band of five megahertz to 40 megahertz may be used not only for cable television control, as it is currently implemented, but may be used for carrying telephonic signals. A problem with using the cable plant to carry telephonic signals, however, is that the currently available bandwidth, due to standard frequency allocations, for carrying telephonic signals is very small. By way of example, the available bandwidth in some systems is very small. By way of example, the available bandwidth in some systems is only 35 megahertz.

SUMMARY OF THE INVENTION

A network for telephonic communication includes using existing infrastructure for cable television. Namely, existing coaxial cabling for cable television is used to carry digital or analog telephone signals originating from a wireline phone or from a wireless phone. To accommodate growth trends and the development of systems such as the PCS communication systems, currently existing frequency allocations for cable television are redefined to support the multitude of communication solutions that can be provided by the existing cable plants.

Frequency allocations for transmission of cable signals are redefined within the coaxial cable plant, namely the cable plant head end and the coaxial cable network, in the following manner: a first portion is used for control and for carrying television cable signals; a second portion is used for PCS, GSM, and PSTN communication signals; and a third portion is used for carrying digital and interactive television programs. Under some proposed systems, a 100 megahertz (MHZ) frequency band has been defined at the upper end of the frequency range of a coaxial cable. More specifically, some proposed systems allocate the frequency band for carrying PCS signals at an upper end of a coaxial cable frequency bandwidth, namely beginning at 800 MHZ and terminating at 900 MHZ. The frequency allocations for telephonic communications are redefined herein, however, at a midrange in between the analog cable television channels and the digital and interactive television channels. The allocation of a midrange frequency band is advantageous in that currently available telephonic equipment readily operate at these midrange frequency bands. Moreover, telephonic equipment operable at the higher frequency ranges must be necessarily more sophisticated and therefore more expensive.

The cable head end only performs all nontelephonic signaling in those frequency bands not specifically reserved for telephonic traffic including PCS traffic. Equipment external to the cable plant is used for controlling routing and signaling of telephonic traffic. This way, new telephonic frequency allocations to create system coordination with telephonic equipment are accommodated in a manner which minimizes required changes to the CATV head end. For this embodiment, independent circuitry for inserting telephonic traffic into the cable plant within the specified frequency band is coupled in-line to the coaxial cable. The independent circuitry for inserting telephonic traffic into the cable plant includes a tunable frequency time division multiplex access system for transmitting a block of data within a specified time slot at a specified frequency channel. The independent circuitry for inserting telephonic traffic communicates with corresponding circuitry to synchronize the operation of the two systems in a manner that allows the corresponding circuitry to extract the telephonic traffic.

BRIEF DESCRIPTION OF THE DRAWINGS

Other advantages and novel features of the present invention will become apparent from the following detailed description of the invention when considered in conjunction with the accompanying drawings in which.

DETAILED DESCRIPTION OF THE PREFERRED EMBODIMENT

Figure 1A:
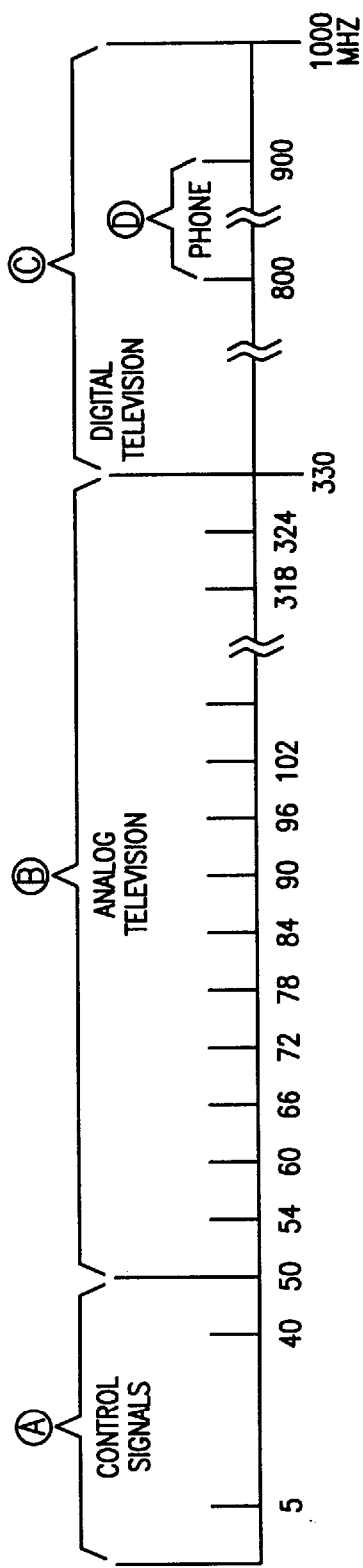
FIG. 1A is a frequency allocation chart illustrating typical frequency allocations for a coaxial cable.

Referring to FIG. 1A, a frequency allocation chart illustrates frequency band assignments similar to assignments currently made within cable television coaxial cable plants. While specific frequency points on the allocation chart may vary some, the frequency allocation chart of FIG. 1A represents typical frequency points for each of the defined frequency bands. As may be seen, the frequency chart shown is broken into four sections, namely, sections A,B,C and D. Sections A, B and D represent frequency assignments within a cable plant for carrying typical cable television signals.

Section A is typically used for transmission of cable control signals in existing systems. Some systems, also transmit telephonic traffic in the frequency band of section A. Regarding section B, each channel assignment utilizes 6 megahertz bandwidth for transmission of the analog cable television channel. FIG. 1 illustrates n number analog television channels being transmitted within section B. The ending point of section B and the beginning point of section C may vary depending upon the specific channel allocations within section B.

Section C is a frequency allocation for digital television and for interactive television. As may be seen, section C includes section D. Section D corresponds to a frequency allocation within the cable plant for carrying PCS as proposed by others.

Figure 1B:
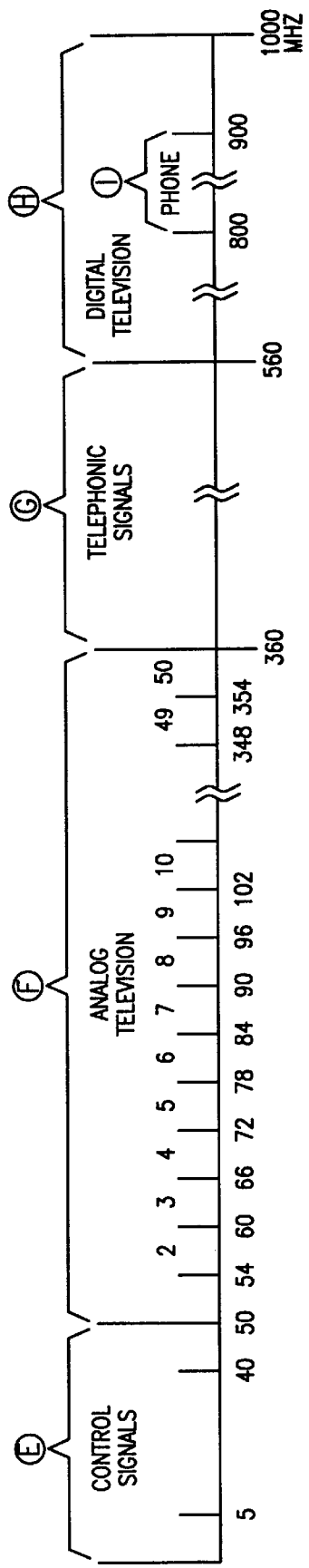
FIG. 1B is a frequency allocation chart illustrating frequency allocations for a coaxial cable which frequency allocations include a new frequency band for transporting telephonic signals.

Referring to FIG. 1B, a frequency allocation chart illustrates the new frequency band assignments for carrying telephonic traffic within the cable plant in relation to typical cable television signal frequency bands. As may be seen, the frequency allocation chart is broken into five sections, namely, sections E, F, G, H, and I. Sections E, F and H represent frequency assignments within a cable plant for carrying typical cable television signals. Other than some differences in the beginning and ending frequency points of sections E, F and H, these sections as similar to sections A, B and D of FIG. 1A. Section G represents a new frequency allocation for carrying telephonic traffic while section I is similar to section D of FIG. 1A in that it represents at least one current proposal for transmitting PCS signals.

Section G, as indicated before, is the new frequency allocation for carrying telephonic signals from a wireline system or from a PCS communication system. In the system of FIG. 1, section G begins at 360 megahertz and terminates at 560 megahertz. As may be seen, therefore, section G includes a 200 megahertz bandwidth. In other systems, however, section G could include differing bandwidths according to the defined beginning point and end point of the frequency band.

Figure 2:
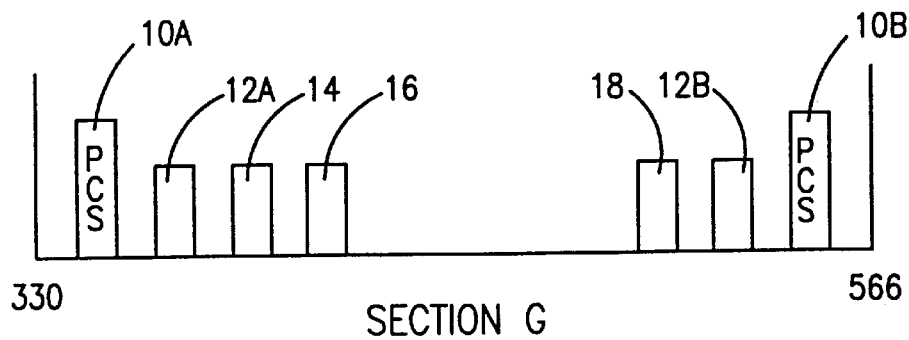
FIG. 2 is a frequency allocation chart illustrating for carrying telephonic traffic within the new frequency band of the cable plant.

Referring now to FIG. 2, a frequency allocation chart illustrating exemplary channel assignments within a section G is shown. The following discussion of FIG. 2 illustrates an example of frequency assignments and how the selection of a starting frequency for section G can effect frequency channel assignments for the analog television channels as well as channel selection within section G by telephonic equipment. As may be seen from examining FIG. 2, frequency slots 10A and 10B carry the bidirectional telephonic communications, namely, traffic for a PCS channel. Channel 10A carries telephonic communication traffic from a first location of a coaxial cable plant to a second location of the coaxial cable plant while channel 10B carries communication traffic from the second location to the first location.

Channels 12A and 12B carry the bidirectional traffic communications from a third location to a fourth location and visa versa. In this example, channels 12A and 12B are also carrying bidirectional telephonic communication traffic. Channels 12A and 12B could be, just as readily, be carrying yet another set of PCS bidirectional communications traffic. Channels 14, 16 and 18 are channels carrying unidirectional signals. In this exemplary system the beginning frequency point section G is 330 MHz. As may be seen in FIG. 1A, some cable television channels, by way of example, cable television channels 49 and 50 extended beyond the 330 megahertz beginning point for section G of FIG. 1B. Cable television channels 49 and 50 have been assigned semipermanently to frequency channels within section G as indicated by frequency channels 14 and 16. Accordingly, the frequency bands forming channels 14 and 16 are not available for use within section G for carrying telephonic signals. Thus, the operation of the CATV and the telephonic equipment is generally independent of each other except for in a scenario similar to this where there is a need to semipermanently assign several cable television frequency channels within the section G which has been reserved primarily for telephonic communication traffic. If there is no need for cable television channels to be assigned within the frequency band allocated for telephonic communication, on the other hand, the CATV plant and the telephonic equipment using the cable plant infrastructure as a transmission medium operate independently.

Figure 3:
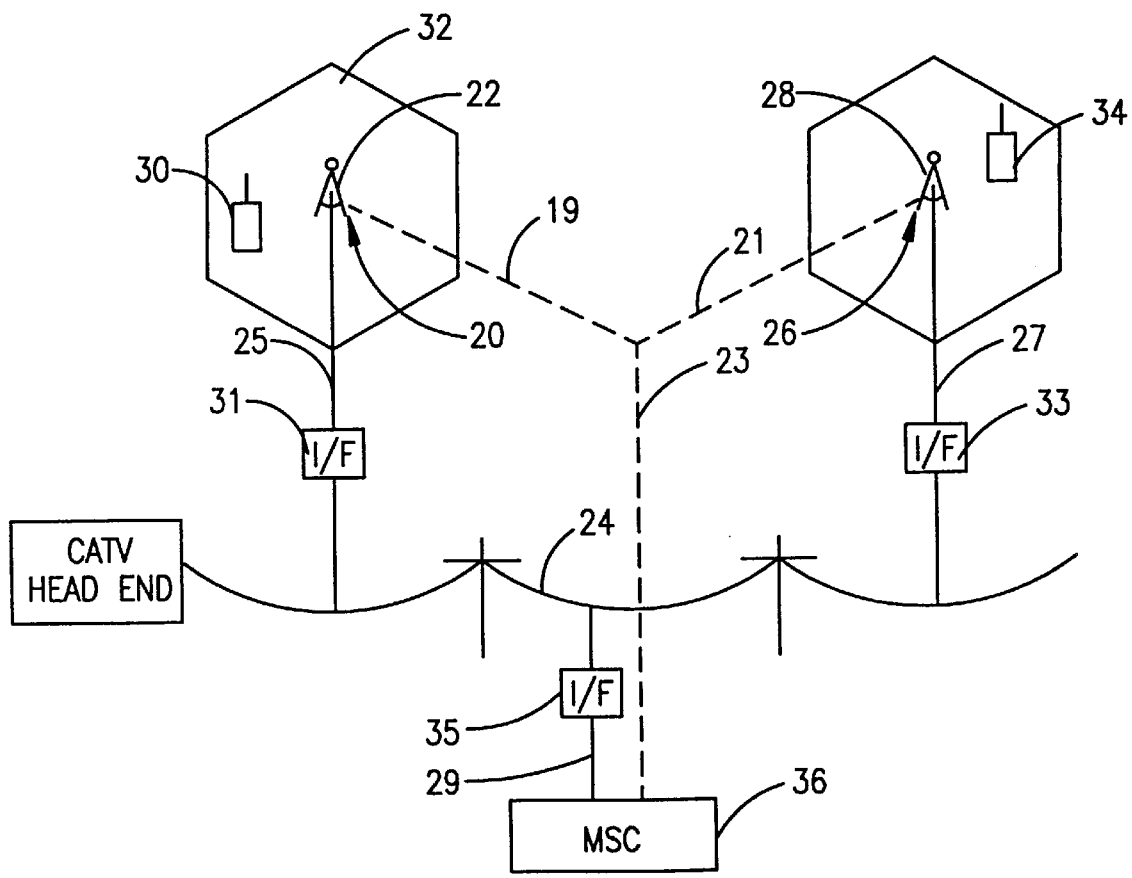
FIG. 3 is a functional system diagram illustrating two cell areas of a communication network.

Referring now to FIG. 3, a communication network is shown which illustrates some of the exemplary bidirectional sources of traffic on frequency channels 10A and 10B as discussed above in relation to FIG. 2. The first location 20 is the location where a first base station 22 for a PCS system is coupled to the cable plant 24 while the second location 26 is where a second base station 28 is coupled to the cable plant 24. The PCS communication traffic, in this embodiment is generated by the two PCS mobile stations 30 and 34. It is interface circuitry 31 and 33 for the base stations 22 and 28 at locations 20 and 26, respectively, that insert the PCS communication traffic in channels 10A and 10B, respectively. Mobile station 30 is within cell area 32 which is served by base station 22 while mobile station 34 is within cell area 36 which is served by base station 28.

In current systems, first and second base stations 22 and 28 and mobile switching center 36 communicate over T1 cabling as shown in FIG. 3 by dashed lines 19, 21 and 23. Within the system of FIG. 3, however, base stations 22 and 28 and mobile switching center 36 are coupled, for communicating with each other, to coaxial cable network 24 of a cable plant by lines 25, 27 and 29 and by interface units 31, 33 and 35, respectively. Under current systems, leasing of T1 lines is frequently necessary to create the network shown by dashed lines 19, 21 and 23. Use of the coaxial network 24 as an alternative to the T1 lines can potentially save cellular communication companies large amounts of money as expected demand for transporting telephonic signals increases.

Figure 4:
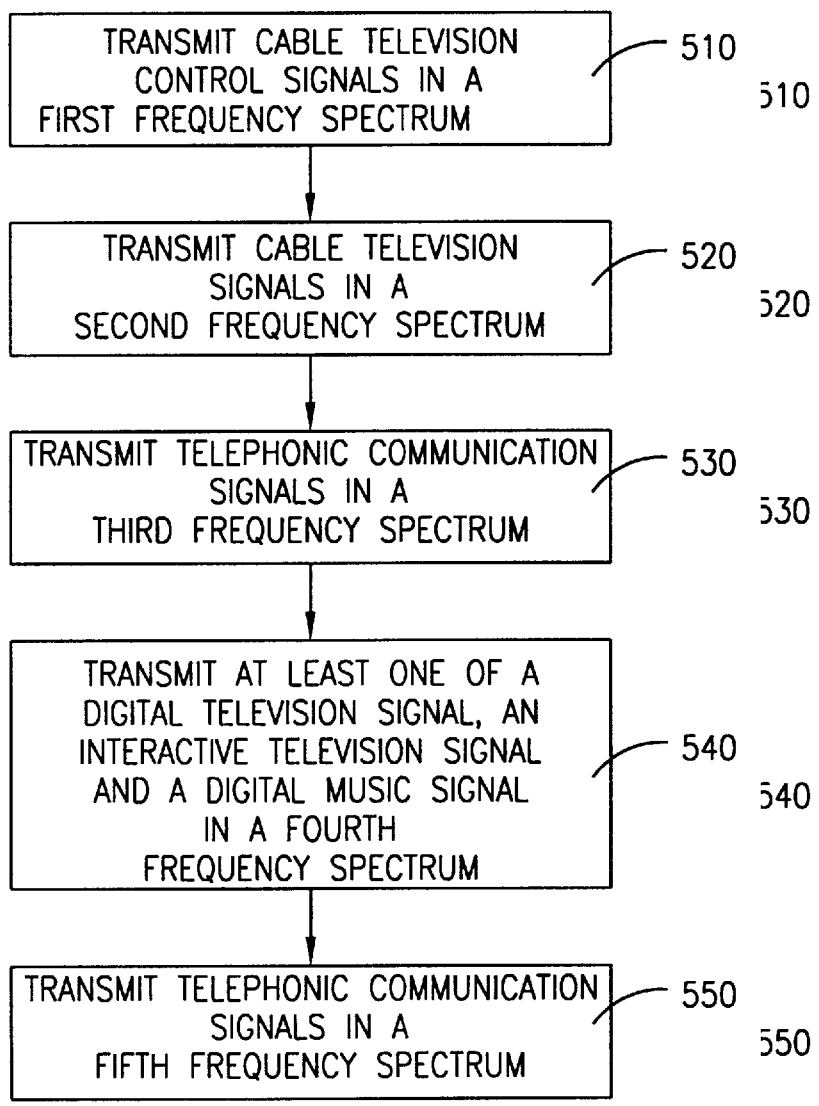
FIG. 4 is a flow chart illustrating a method for transmitting telephonic signals within a coaxial cable network.

Referring now to FIG. 4, one embodiment of a method for transporting telephonic signals as well as cable television signals within the cable television cable plant is shown. Cable television control transmitted at a frequency band in the range of 5 megahertz to 40 megahertz (step 510). One example of such a control signal is pay-per-view ordering information. Telephonic signals are no longer transmitted within the 5 megahertz to 40 megahertz band as found in the prior art.

While cable television control signals are transmitted in the first frequency band, cable television signals are transmitted in the second frequency band (step 520). These television signals can be formed of either analog or digital television signals.

Telephonic communication signals are transmitted in a third frequency band (step 530). The third frequency band follows the second frequency band and is for transmitting voice and data, also known as traffic, as well as signals from any other type of system needing to transmit signals point to point. Examples of the types of signals which are to be transmitted in the third frequency band include traffic light signaling, video and sound from close circuit systems such as security systems, data from computer networks, point to point telemetry, public land mobile network signals, public switched telephone signals and Internet signals. Digital television signals, interactive television, digital music, and other types of signals excluding analog television channels are transmitted in a fourth frequency band (step 540). Telephonic communication signals, such as PCS signals and other forms of traffic and control signals for telephonic communication networks are transmitted in a fifth frequency band (step 550).

Each of the above listed steps occur in a frequency band that is within the frequency spectrum of standard coaxial cables. If, however, different cabling is used, which different cabling has a greater bandwidth, then the invention includes adjustment and increase of the defined frequency bands in terms of bandwidth so that the total bandwidth of the cable is utilized.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A communication network, comprising:
   a coaxial cable network;
   a cable television head end coupled to transmit a first set of signals on said coaxial cable network within a separated first and a second frequency band;
   a telecommunication network device coupled to transmit on said coaxial cable network a second set of signals within a third frequency band, the third frequency band including frequencies that are higher than the first frequency band and lower than the second frequency band; and
   wherein said cable television signal head end further transmits at least one cable television channel signal on said coaxial cable network within said third frequency band.

2. The communication network of claim 1 wherein the first frequency band includes analog television channel signals.

3. The communication network of claim 2 wherein the second frequency band includes digital television signals.

4. The communication network of claim 3 wherein the second frequency band includes interactive television signals.

5. The communication network of claim 1 wherein the third frequency band includes wireless communication signals.

6. The communication network of claim 5 wherein the wireless communication signals are comprised of personal communication system ("PCS") signals.

7. The communication network of claim 6 wherein the wireless communication signals are further comprised of public service telephone network ("PSTN") signals.

8. The communication network of claim 1 wherein the telecommunication device is a base station.

9. The communication network of claim 1 wherein the telecommunication device is a mobile switching center.

10. The communication network of claim 1 wherein the telecommunication device is a short message service center.

11. The communication network of claim 1 wherein the telecommunication device is a home location register.

12. The communication network of claim 1 wherein said second set of signals comprises:
   first telephonic communication traffic signals transmitted in one direction, said first telephonic communication traffic signals transmitted at a frequency less than said at least one cable television channel signal within said third frequency band; and
   second telephonic communication traffic signals transmitted on an opposite direction, said second telephonic communication traffic signals transmitted at a frequency higher than said at least one cable television channel signal within said third frequency band.

13. A method of transmitting television channel signals and telephonic signals over a single communication medium, the method comprising the steps of:
   transmitting television channel signals over a separated first frequency band and second frequency band;
   transmitting telephonic signals over a third frequency band, the third frequency band being interposed between the separated first and second frequency bands; and
   transmitting at least one television channel signal within the third frequency band.

14. The method of claim 13 wherein the step of transmitting television signals over the first frequency band is further comprised of the step of transmitting analog television signals.

15. The method of claim 14 wherein the step of transmitting television signals over the second frequency band is further comprised of the step of transmitting digital television signals.

16. The method of claim 15 wherein the step of transmitting television signals over the second frequency band is further comprised of the step of transmitting interactive television signals.

17. The method of claim 13 wherein the step of transmitting telephonic signals over the third frequency band further comprises the step of transmitting personal communication system ("PCS") signals.

18. The method of claim 13 wherein the step of transmitting telephonic signals over the third frequency band further comprises the step of transmitting public service telephone service ("PSTN") signals.

19. The method of claim 13 further including the step of transmitting telephonic signals in a fourth frequency band, the fourth frequency band being formed within the second frequency band.

20. The method of claim 13 wherein the step of transmitting telephonic signals in the third frequency band includes transmitting telephonic signals using a frequency division multiple access protocol.

21. The method of claim 13 wherein the step of transmitting telephonic signals in the third frequency band includes transmitting telephonic signals using a time division multiple access protocol.

22. The method of claim 13 wherein said step of transmitting telephonic signals further comprises the steps of:

transmitting first telephonic communication traffic signals in one direction at a frequency lower than said at least one television channel signal; and transmitting second telephonic communication traffic signals in an opposite direction at a frequency higher than said at least one television channel signal.

* * * * *